US005079077A

United States Patent [19]

Sakayanagi et al.

[11] Patent Number: 5,079,077

[45] Date of Patent: Jan. 7, 1992

[54] FIRE-RESISTANT COMPOSITE MICA INSULATION

[75] Inventors: Kenji Sakayanagi; Shinichi Shoji; Makoto Kobayashi, all of Mibu, Japan

[73] Assignee: Nippon Rike Kogyosho Co., Ltd., Tokyo, Japan

[21] Appl. No.: 417,188

[22] Filed: Oct. 4, 1989

[30] Foreign Application Priority Data

Jul. 3, 1989 [JP] Japan ................................ 1-171462

[51] Int. Cl.[5] ........................ B32B 19/04; B32B 19/06

[52] U.S. Cl. .................................... 428/237; 428/241; 428/286; 428/324; 428/325; 428/328; 428/330; 428/331; 428/354; 428/355; 428/356; 428/428; 428/446; 428/447; 428/454; 428/920; 428/921; 428/237; 428/363

[58] Field of Search ............... 428/428, 446, 363, 355, 428/356, 324, 286, 237, 241, 447, 454, 354, 328, 331, 330, 921, 920, 257; 524/413, 449

[56] References Cited

U.S. PATENT DOCUMENTS

| | | | |
|---|---|---|---|
| 3,618,753 | 11/1971 | Glasspoole | 428/451 |
| 4,286,010 | 8/1981 | Staley et al. | 428/428 |
| 4,496,469 | 1/1985 | Morimoto et al. | 428/447 |
| 4,542,067 | 9/1985 | Yamamoto | 428/447 |
| 4,579,882 | 4/1986 | Kanbe et al. | 523/216 |
| 4,606,785 | 8/1986 | Zeise | 428/324 |
| 4,714,650 | 12/1987 | Obayashi et al. | 428/265 |
| 4,769,276 | 9/1988 | Gruss et al. | 428/324 |

FOREIGN PATENT DOCUMENTS

| | | | |
|---|---|---|---|
| 64-1710 | 1/1989 | Japan . |
| WO-A-8603329 | 6/1986 | PCT Int'l Appl. . |

OTHER PUBLICATIONS

Database Derwent, World Patent Index, AN=-84-020544; & JP-A-58 210 976 (Showa Elec.), Abstract.

*Primary Examiner*—James J. Seidleck
*Assistant Examiner*—Archene Turner
*Attorney, Agent, or Firm*—Nixon & Vanderhye

[57] ABSTRACT

A reinforced mica paper includes reinforced mica paper as a base material obtained by mechanically pulverizing muscovite mica or phlogopite mica to form scaly mica and making the scaly mica into paper, a reinforcing material layer formed on at least one surface of the base material, and an adhesive coated on and impregnated in the reinforcing material layer and consisting of a mixture obtained by mixing arbitrary amounts of a silicone resin, aluminum hydroxide, aluminum silicate, potassium titanate, and a soft mica powder. A method of manufacturing the reinforced mica paper is also disclosed.

8 Claims, 4 Drawing Sheets

FIRE-RESISTANT COMPOSITE MICA INSULATION

BACKGROUND OF THE INVENTION

1. Field of the Invention

The present invention relates to a reinforced mica paper and also a method of manufacturing the paper, and more particularly, to a sheet of reinforced mica paper or a tape of reinforced mica paper tape for use in a fire-resistant electric wire, and also a method of manufacturing the sheet or tape.

2. Description of the Related Art

A fire-resistant electric wire normally consists of a single-core conductor or multi-core conductor. In the fire-resistant electric wire, a reinforced mica paper sheet or a reinforced mica paper tape is used as a fire-resistant insulating folium. The Fire Defence Agency Notification (Standards) in Japan requests the following strict characteristics for the fire-resistant electric wire. That is, (1) the fire-resistant electric wire must withstand a temperature of 840° C. (for 30 minutes) under prescribed load and electric charge conditions, (2) the fire-resistant electric wire must have an insulation resistance of 0.4 MΩ or more (at 840° C.), (3) the fire-resistant electric wire must pass a dielectric strength test of AC 1,500 V, and the like. In standards in foreign countries, e.g., International Standards IEC331, in addition to a regulation such that the fire-resistant electric wire must withstand a temperature of 750° C. for three hours, strict regulations ranging from 750° C. to 900° C. are provided to meet situations in the respective countries. The reinforced mica paper sheet or the like, therefore, has an important role as an insulting film.

For example, the reinforced mica paper tape normally consists of reinforced mica paper having a thickness of 0.09 to 0.11 mm (120 g/m$^2$ to 180 g/m$^2$) as a base material. A glass fiber fabric (or a non-woven fabric) having a thickness of about 0.03 mm is formed as a reinforcing material layer on the base material by using an adhesive consisting of a condensation or addition-polymerization type pressure-sensitive silicone resin paint (varnish).

The reinforced mica paper tape is wound around a conductor by a high-speed winding machine. This insulation normally has a winding thickness of about two ½-lap turns ((0.15 mm×2)×2=0.6 mm).

The tape of reinforced mica paper, however, has no satisfactory dielectric strength great enough to satisfy wide-range fire resistances in foreign countries. In order to increase the dielectric strength, the thickness of the tape or an apparent density of the reinforced mica paper need only be increased. In the former case, however, the thickness of an electric cable is increased to degrade a space factor. In the latter case, since flexibility of a base material is lost, no satisfactory adhesion properties can be obtained when the tape is wound around a conductor. Therefore, as in the former case, a space factor is degraded. A glass fiber fabric as a reinforcing material is stable around a temperature of 700° C. In a high-temperature atmosphere (700° C. to 900° C.), however, since insulation characteristics of the glass fiber fabric are acceleratedly degraded, the glass fiber fabric can no longer serve as a reinforcing material. Therefore, the gas generated within the paper when the paper is heated directly passes through pores in reinforced mica paper to rapidly decrease the insulation resistance of the paper.

Conventional examples are disclosed in Published Unexamined Japanese Utility Model Application No. 56-170698 (former) and Published Examined Japanese Utility Model Application No. 64-1710 (latter). The former example is an electric insulating mica tape in which a backing material is improved to improve mechanical strength and resin impregnation properties. The latter example is a fire-resistant electric cable insulating tape in which the thickness and the number of each of wefts and warps of glass fibers constituting a woven or non-woven fabric are improved.

SUMMARY OF THE INVENTION

It is an object of the present invention to provide reinforced mica paper which can achieve an insulation resistance and an insulation breakdown voltage higher than those of a conventional paper without increasing the thickness or the apparent density of reinforced mica paper.

According to the present invention, there is provided a reinforced mica paper comprising:

a base made of reinforced mica obtained by mechanically pulverizing muscovite mica or phlogopite mica to form scaly mica and making the scaly mica into paper;

a reinforcing material layer formed on at least one surface of the base material; and an adhesive coated on and contained in the reinforcing material layer and consisting of a mixture obtained by mixing 100 parts by weight of a silicone resin, 50 to 200 parts by weight of aluminum hydroxide, 50 to 200 parts by weight of aluminum silicate, 2 to 20 parts by weight of potassium titanate, and 2 to 20 parts by weight of a phlogopite mica powder.

In addition, according to the present invention, there is provided a method of manufacturing a reinforced mica paper, comprising the steps of:

mechanically pulverizing muscovite mica or phlogopite mica to form scaly mica and making the scaly mica into paper, thereby forming reinforced mica paper as a base material;

forming a reinforcing material layer on at least one surface of the base material; and coating and impregnating an adhesive consisting of a mixture obtained by mixing 100 parts by weight of a silicone resin, 50 to 200 parts by weight of aluminum hydroxide, 50 to 200 parts by weight of aluminum silicate, 2 to 20 parts by weight of potassium titanate, and 2 to 20 parts by weight of a phlogopite mica powder in the reinforcing material layer.

DETAILED DESCRIPTION OF THE INVENTION

Scaly mica according to the present invention is obtained by mechanically pulverizing a block of hard mica $H_2KAl_3(SiO_4)_3$ or soft mica $Mg_3Al(SiO_4)_3$. In this case, mechanical pulverization is performed such that a block is pulverized by water jet (water pressure=20 to 40 kg/cm$^2$, flow rate=3 to 5 m$^3$/hour) into scaly or flaky mica, or muscovite or phlogopite mica is sintered and then mechanically pulverized by water jet. In the present invention, phlogopite mica is preferably used. This is because a volume resistivity of phlogopite mica at high temperatures is higher than that of muscovite mica.

Figure 7:
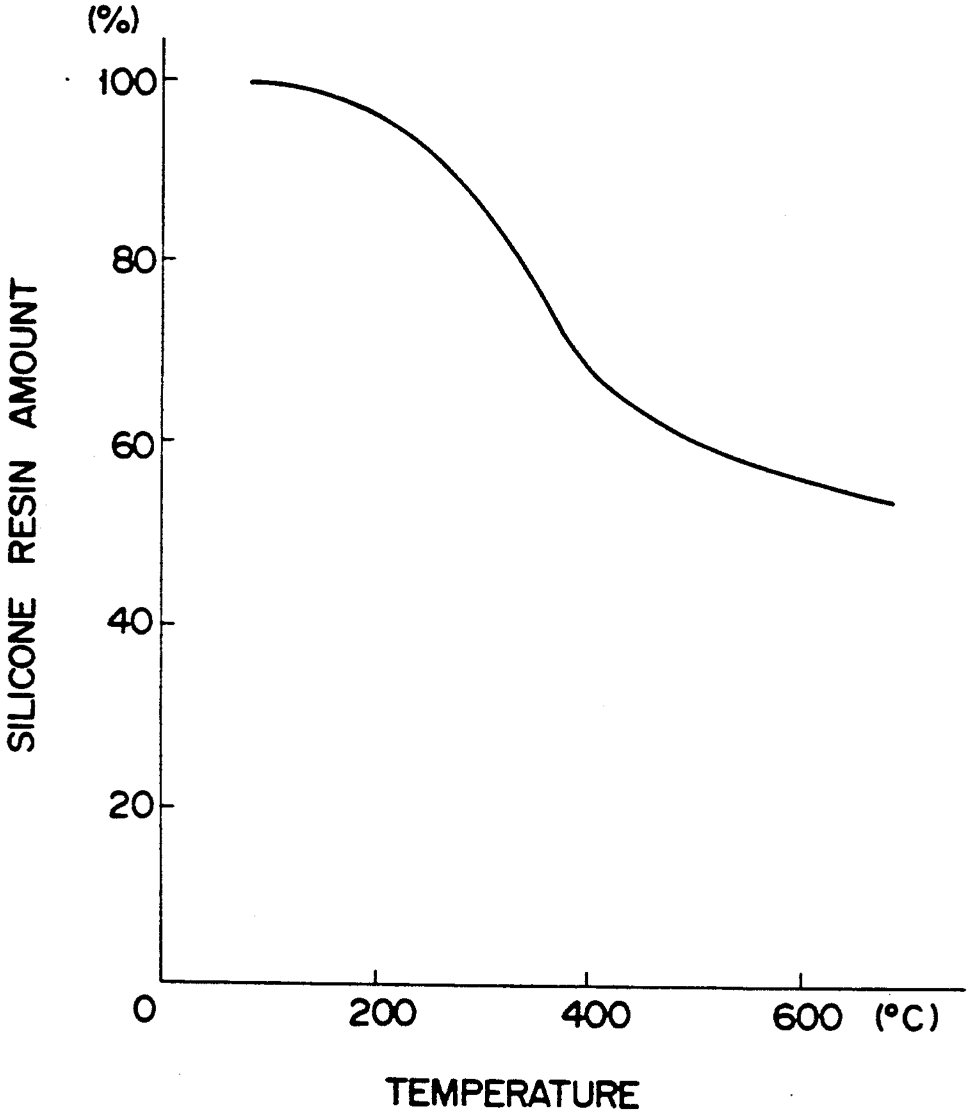
FIG. 7 is a graph showing a relationship between a silicone resin amount and a temperature in an adhesive layer.

A silicone resin as one material of an adhesive according to the present invention remains inside and on the surface of reinforced mica paper in the form of SiO at a temperature of 500° C. or more. The remaining amount is assumed to be about 40% of an amount upon coating of an adhesive (FIG. 7). The silicone resin, therefore, is assumed to be less effective to the surface of a reinforcing material layer and not to contribute to improve dielectric strength.

In the adhesive, it is important to use, as a material, a mixture obtained by adding arbitrary amounts of inorganic fillers, i.e., aluminum hydroxide $Al(OH)_3$, aluminum silicate $Al_2O_3.2SiO_2$, and potassium titanate $K_2O.6TiO_2$, and a soft mica powder to the silicone resin. In this case, aluminum hydroxide has a flaky shape (thin plate shape) and a grain size of about 0.1 to 1 μm. Aluminum silicate has a flaky shape and a thickness of about 1 to 5 μm. Potassium titanate has a needle shape and a grain size of 10 to 20 μm. The phlogopite mica powder has a flaky shape and a grain size of about 60 to 110 μm.

In order to select the above inorganic fillers, the present inventors checked a volume resistivity, an insulation breakdown voltage, and an outer appearance after degradation of reinforced mica paper in which a reinforcing material layer using each of various materials shown in Table 1 is formed. As is apparent from Table 1, sample No. 16 (Example) satisfies all of the above characteristics. Note that Table 1 also shows the results obtained by using, as an inorganic filler, titanium oxide (No. 1), calcium carbonate (No. 2), potassium titanate (No. 3), aluminum silicate (No. 4), diatomaceous earth (No. 5), aluminum hydroxide (No. 6), alumina (No. 7), silica (No. 8), vermiculite (No. 9), a phlogopite mica powder (No. 10), diatomaceous earth and aluminum hydroxide (No. 11), 150 parts by weight of titanium oxide and 150 parts by weight of silica (No. 12), 150 parts by weight of potassium titanate and 150 parts by weight of alumina (No. 13), 150 parts by weight of aluminum silicate and 150 parts by weight of vermiculite (No. 14), and five pars by weight of potassium titanate, potassium silicate, and aluminum hydroxide (No. 15). In No. 16, it is preferable to add an inorganic filler consisting of 50 to 200 parts by weight of aluminum hydroxide, 50 to 200 parts by weight of aluminum silicate, 2 to 20 parts by weight of potassium titanate, and 2 to 20 parts by weight of a phlogopite mica powder, with respect to 100 parts by weight of a silicone resin. This is because if the content of each material of the inorganic filler falls outside the above range, no satisfactory adhesive effect can be obtained. In particular, potassium titanate is important in order to obtain proper entanglement between the respective inorganic fillers. It is important to determine a mixing ratio of the above inorganic fillers by arbitrarily combining the inorganic fillers utilizing good characteristics of the respective fillers. Aluminum hydroxide has a property of releasing water of crystallization of the substance at 400° C. or more. For this reason, aluminum hydroxide prevents a conductive decomposition gas from penetrating into a mica layer. Aluminum silicate is stable throughout room to high temperatures and therefore has an important property for improving the fire resistance together with aluminum hydroxide. Potassium titanate and the phlogopite mica powder effectively serve to maintain a bonding strength between aluminum hydroxide and aluminum silicate as flaky fillers.

A total amount of the inorganic fillers is preferably 104 to 440 parts by weight with respect to 100 parts by weight of the silicone resin in terms of the characteristics. This is because if the total amount is less than 104 parts by weight, an insulation breakdown voltage cannot be sufficiently increased at high temperatures, and if the total amount exceeds 440 parts by weight, adhesion properties between the base material and the reinforcing material layer are degraded.

Examples of the material of the reinforcing material layer are a glass fiber fabric, glass fiber non-woven fabric, a fabric constituted by a glass fiber yarn as a warp and a thermoplastic resin fiber yarn as a weft, a non-woven fabric constituted by a glass fiber yarn as a warp and a thermoplastic resin fiber yarn as a weft, and a plastic film.

DESCRIPTION OF THE EMBODIMENT

Example 1

Figure 1:
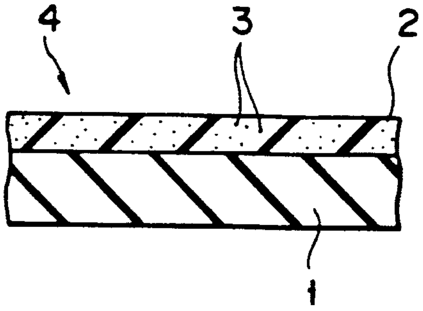
FIG. 1 is a sectional view of a reinforced mica paper according to Example 1 of the present invention.

An example of the present invention will be described in detail below. FIG. 1 shows a reinforced mica paper according to Example 1 of the present invention.

A base material 1 is obtained by mechanically pulverizing phlogopite mica by water jet to form scaly mica and making the scaly mica into paper. A reinforcing material layer 2 is formed on one surface of the base material 1. A material of the layer 2 is a glass fiber fabric. An adhesive 3 permeates into the layer 2, and adheres the layer 2 on the base material 1 with good adhesion properties. A material of the adhesive

| 3 consists of a mixture of the following materials. | |
|---|---|
| Silicone Resin (SD-7320 (tradename) (volatile content = 30%), available from TORAY SILICONE INC.) | 100 parts by weight |
| Aluminum Hydroxide (Hydiride H40 (tradename), available from Showa Denko K.K.) | 150 parts by weight |
| Aluminum Silicate (Burgess #30 (tradename), available from Burgess & Pigment Co.) | 150 parts by weight |
| Potassium Titanate (TISMO D type (tradename), available from Otsuka Chemical Co.) | 5 parts by weight |
| Phlogopite Mica Powder (Suzolight 325 HK (available from KURARAY CO. LTD.) | 5 parts by weight |

The reinforced mica paper having the above arrangement is manufactured as follows.

(1) Phlogopite mica is mechanically pulverized in a water flow at a water pressure of 20 to 40 kg/cm$^2$ and a flow rate of 3 to 5 $m^3$/hour to form flaky, scaly mica (grain size = 10 to 100 μm), and the mica is made into paper by using a cylinder paper machine or a wire paper machine, thereby forming a base material 1 having a thickness of 0.09 to 0.11 mm and a mass of 120 to 180 $g/m^2$.

Figure 2:
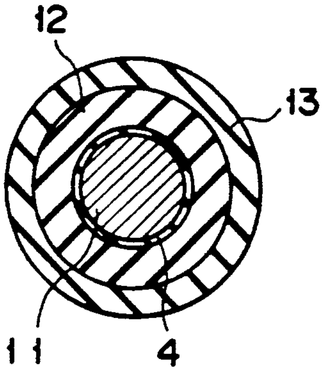
FIG. 2 is a sectional view of a fire-resistant electric cable using the tape shown in FIG. 1.

(2) 50 parts by weight of aluminum hydroxide, 50 parts by weight of aluminum silicate, 5 parts by weight of potassium titanate, and 5 parts by weight of a soft mica powder are added as inorganic fillers tc 100 parts by weight of a silicone resin and sufficiently mixed to prepare a mixture. An adhesive 3 consisting of this mixture is uniformly coated on and impregnated in a reinforcing material layer 2 consisting of a glass fiber fabric. The layer 2 is adhered on the base material 1 to manufacture a reinforced mica paper 4. This reinforced mica paper is used as a fire-resistant electric wire as shown in FIG. 2. Referring to FIG. 2, reference numeral 11 denotes a conductive wire; 12, a crosslinked polyethylene resin layer; and 13, a vinyl chloride sheath insulating layer.

The reinforced mica paper according to Example 1 is constituted by the base material 1 consisting of phlogopite mica, the reinforcing material layer 2 formed on one surface of the base material 1, and the adhesive 3 for bonding the base material 1 and the layer 2 and consisting of the mixture obtained by arbitrarily mixing a silicone resin, aluminum hydroxide, aluminum silicate, potassium titanate, and a phlogopite mica powder. Therefore, even in a high-temperature atmosphere at 850° C. or more, penetration of a gas decomposed from the crosslinked polyethylene resin layer 12 and the vinyl chloride sheath insulating layer 13 can be prevented to realize high insulation resistance and insulation breakdown voltage (Table 1, No. 16).

Figure 6:
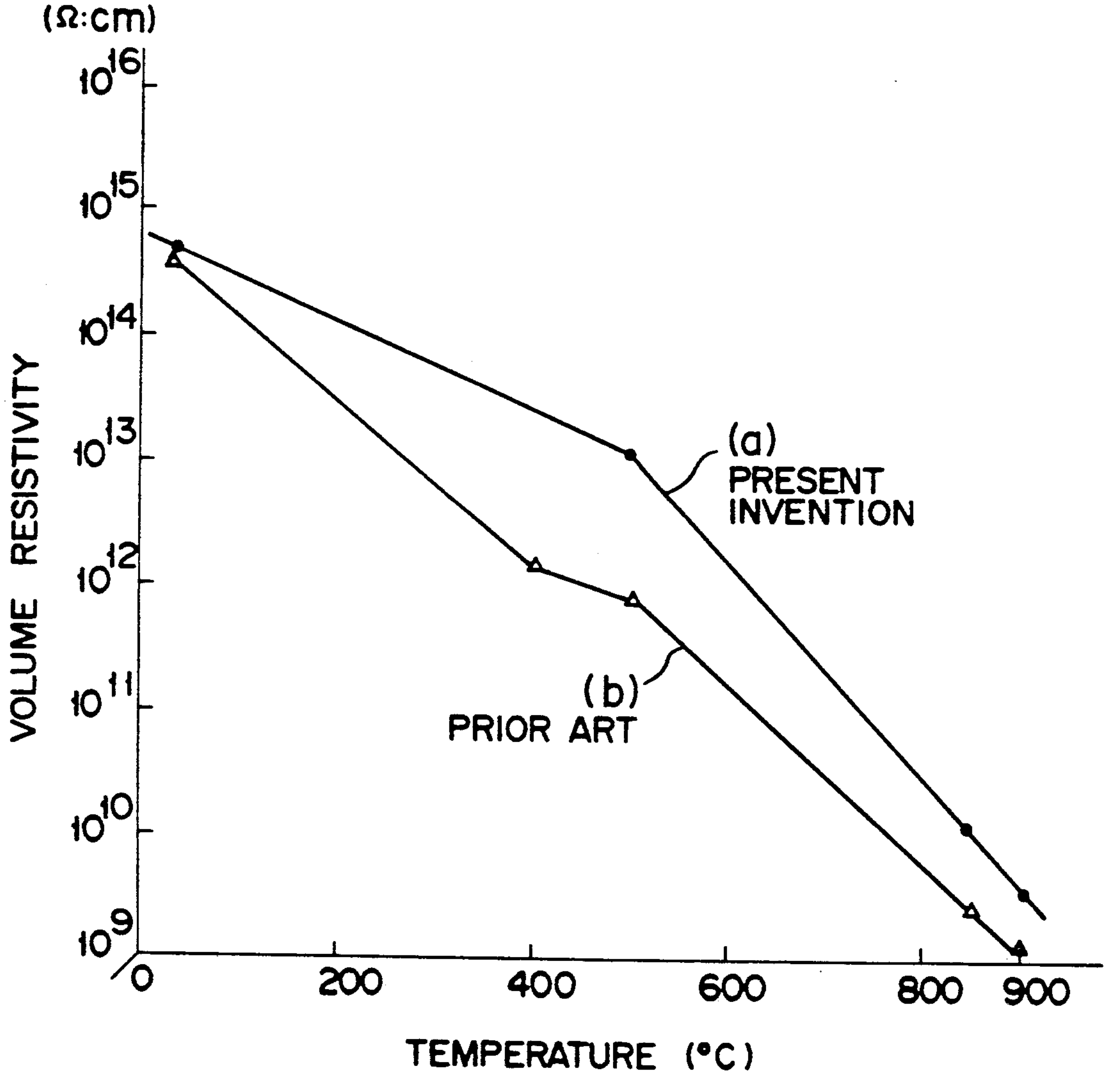
FIG. 6 is a graph showing a relationship between a volume resistivity and a temperature in each of reinforced mica paper according to the present invention and a conventional technique.
Figure 8:
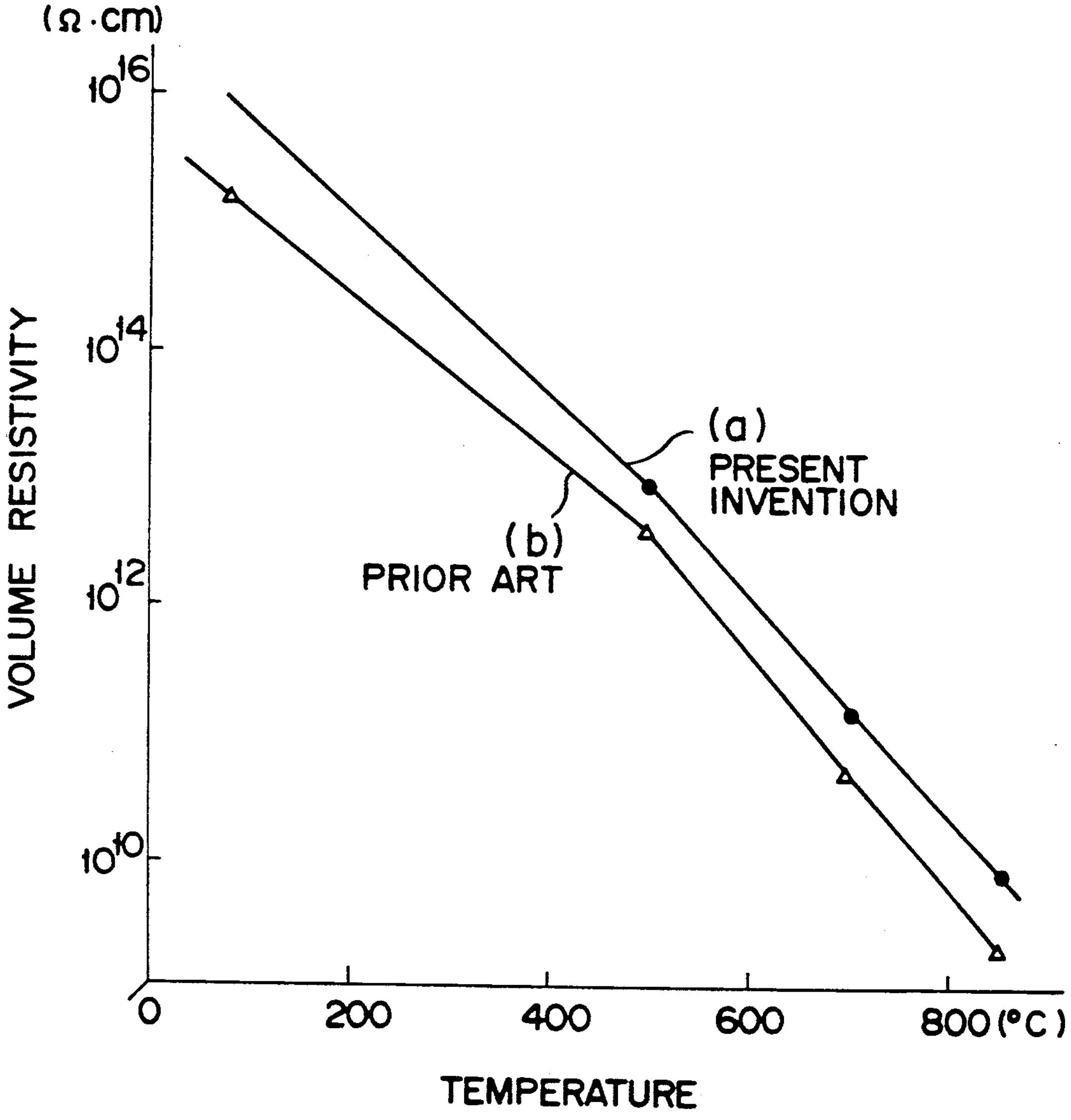
FIG. 8 is a graph showing a relationship between a volume resistivity and a temperature in each of reinforcing layers according to the present invention and a conventional technique.

FIG. 8 shows the results of checking a relationship between a volume resistivity and a temperature of each of a reinforcing material layer (a) on which the adhesive according to the present invention is coated and a reinforcing material layer (b) on which a conventional silicone resin is coated. As is apparent from FIG. 8, the reinforcing material layer according to the present invention has a higher volume resistivity than that of the conventional reinforcing material layer. FIG. 6 shows the results of checking a relationship between a volume resistivity and a temperature of each of a reinforced mica paper according to the reinforcing material layer (a) or (b). As is apparent from FIG. 6, the tape according to the present invention has a higher volume resistivity than that of the conventional tape. According to the insulating tape of the present invention, an insulation breakdown voltage can be maintained from a state (2.5 kV) to 85% or more (2.2 kV) when a temperature is decreased from 900° C. to room temperature. Note that FIGS. 6 and 8 are graphs in which actual measurement values of the volume resistivity and temperature are plotted. As is apparent from FIGS. 6 and 8, a linear relationship is obtained within a temperature range of 500° C. or more. Note that linear portions in these graphs are obtained by experiments for checking that a known reaction rate equation, i.e., an Arrhenius equation can be applied. The present inventors selected the respective inorganic fillers on the basis of this equation.

In Example 1, 150 parts by weight of aluminum hydroxide (B), 150 parts by weight of aluminum silicate (C), 5 parts by weight of potassium titanate (D), and 5 parts by weight of a phlogopite mica powder (E) are used as inorganic fillers with respect to 100 parts by weight of a silicon resin (A). The mixing ratio, however, is not limited to that of Example 1. That is, effects similar to those of Example 1 can be expected as long as B: 50 to 200 parts by weight, C: 50 to 200 parts by weight, D: 2 to 20 parts by weight, and E: 2 to 20 parts by weight with respect to A: 100 parts by weight. More specifically, examples are B: 150 parts by weight, C: 150 parts by weight, D: 10 parts by weight, and E: 10 parts by weight (Example 2); B: 100 parts by weight, C: 200 parts by weight, D: 5 parts by weight, and E: 5 parts by weight (Example 3); B: 200 parts by weight, C: 200 parts by weight, D: 5 parts by weight, and E: 5 parts by weight (Example 4); and B: 200 parts by weight, C: 200 parts by weight, D: 20 parts by weight, and E: 20 parts by weight (Example 5). Table 2 (to be presented later) is obtained by measuring the volume resistivity, the dielectric breakdown voltage, and the like of insulating tapes according to these examples.

Figure 3:
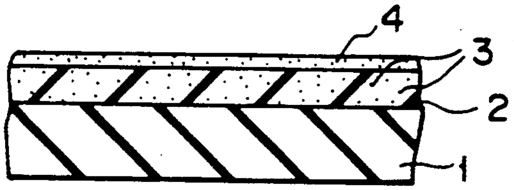
FIGS. 3, 4, and 5 are sectional views showing laminated mica insulating tapes according to other examples of the present invention respectively.
Figure 4:
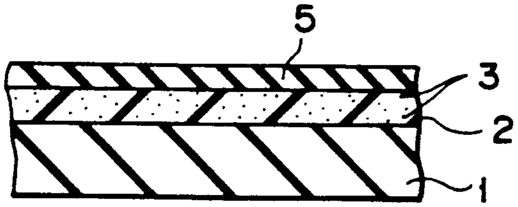
Figure 5:
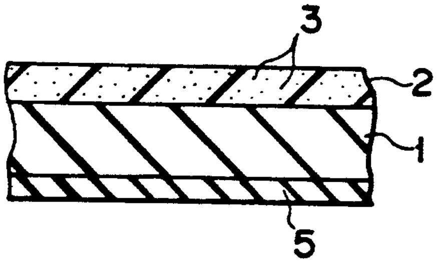

In the above examples, the reinforced mica paper is constituted by forming the reinforcing material layer coated with the adhesive containing inorganic fillers on one surface of the base material. The present invention, however, is not limited to the above arrangement. Examples of an insulating tape having another arrangement are an insulating tape (FIG. 3) in which a large amount of an adhesive is coated on a reinforcing material layer so that an adhesive layer 4 is formed outside a reinforcing material layer 2 on which an adhesive 3 is coated, an insulating tape (FIG. 4) in which a plastic film 5 is formed outside a reinforcing material layer 2, and an insulating tape (FIG. 5) in which a reinforcing material layer 2 on which an adhesive 3 is coated is formed on the upper surface of a base material 1 and a plastic film 5 is formed on the lower surface of the base material 1. Furthermore, in the above examples, the present invention is applied to the reinforced mica paper. The present invention, however, can be applied to a sheet of reinforced mica paper.

TABLE 1

| Sample No. | Volume Resistivity (Ω.cm) | | | Dielectric Breakdown Voltage (KV) | | Outer Appearance After Degradation |
|---|---|---|---|---|---|---|
| | 100° C. | 500° C. | 850° C. | Normal State | After 850° C.-Degradation (Room Temperature) | |
| 1 | $2 \times 10^{14}$ | $1 \times 10^{12}$ | $1.5 \times 10^{9}$ | 1.9 | 1.5 | Poor |
| 2 | $5 \times 10^{14}$ | $9 \times 10^{11}$ | $1.5 \times 10^{9}$ | 1.9 | 1.5 | Poor |
| 3 | $4 \times 10^{13}$ | $3 \times 10^{12}$ | $3 \times 10^{9}$ | 1.8 | 1.4 | Good |
| 4 | $2 \times 10^{14}$ | $1.5 \times 10^{13}$ | $1 \times 10^{10}$ | 2.4 | 2.0 | Good |
| 5 | $2 \times 10^{14}$ | $6 \times 10^{13}$ | $5 \times 10^{9}$ | 2.0 | 1.6 | Poor |
| 6 | $6 \times 10^{13}$ | $2 \times 10^{12}$ | $3 \times 10^{9}$ | 2.2 | 1.9 | Good |
| 7 | $2 \times 10^{14}$ | $8 \times 10^{12}$ | $6 \times 10^{9}$ | 2.0 | 1.7 | Normal |
| 8 | $1 \times 10^{14}$ | $9 \times 10^{11}$ | $2 \times 10^{9}$ | 1.9 | 1.5 | Poor |
| 9 | $1 \times 10^{14}$ | $4 \times 10^{11}$ | $1 \times 10^{9}$ | 1.9 | 1.5 | Poor |
| 10 | $2 \times 10^{14}$ | $6 \times 10^{12}$ | $4 \times 10^{9}$ | 2.1 | 1.7 | Normal |
| 11 | $1.5 \times 10^{14}$ | $6 \times 10^{12}$ | $6 \times 10^{9}$ | 2.1 | 1.7 | Normal |

TABLE 1-continued

| Sample No. | Volume Resistivity (Ω.cm) 100° C. | 500° C. | 850° C. | Dielectric Breakdown Voltage (KV) Normal State | After 850° C.-Degradation (Room Temperature) | Outer Appearance After Degradation |
|---|---|---|---|---|---|---|
| 12 | $2 \times 10^{14}$ | $1 \times 10^{12}$ | $2 \times 10^{9}$ | 1.9 | 1.5 | Normal |
| 13 | $1 \times 10^{14}$ | $1 \times 10^{12}$ | $2 \times 10^{9}$ | 2.0 | 1.6 | Normal |
| 14 | $2 \times 10^{14}$ | $7 \times 10^{12}$ | $1 \times 10^{10}$ | 2.0 | 1.7 | Normal |
| 15 | $1 \times 10^{14}$ | $8 \times 10^{12}$ | $1 \times 10^{10}$ | 2.1 | 1.8 | Good |
| 16 | $2 \times 10^{14}$ | $1.2 \times 10^{13}$ | $1 \times 10^{10}$ | 2.5 | 2.2 | Best |

TABLE 2

| | Volume Resistivity (Ω.cm) 100° C. | 500° C. | 850° C. | 900° C. | Dielectric Breakdown Voltage (KV) Normal State | After 850° C. For 30 Min. (Room Temperature) | After 900° C. For 30 Min. (Room Temperature) | Outer Appearance After 900° C. For 30 Min. |
|---|---|---|---|---|---|---|---|---|
| Example 1 | $2 \times 10^{14}$ | $1.2 \times 10^{13}$ | $1 \times 10^{10}$ | $5.5 \times 10^{9}$ | 2.5 | 2.2 | 2.2 | Best |
| Example 2 | $1 \times 10^{14}$ | $9 \times 10^{12}$ | $8 \times 10^{9}$ | $4 \times 10^{9}$ | 2.4 | 2.1 | 2.0 | Best |
| Example 3 | $3 \times 10^{14}$ | $2.5 \times 10^{13}$ | $2 \times 10^{10}$ | $8 \times 10^{9}$ | 2.4 | 2.1 | 2.1 | Best |
| Example 4 | $1 \times 10^{14}$ | $2 \times 10^{13}$ | $1 \times 10^{10}$ | $5 \times 10^{9}$ | 2.2 | 1.9 | 1.9 | Good |
| Example 5 | $9 \times 10^{13}$ | $8 \times 10^{12}$ | $5 \times 10^{9}$ | $3 \times 10^{9}$ | 2.1 | 1.9 | 1.9 | Good |
| Conventional Control | $1 \times 10^{14}$ | $8 \times 10^{11}$ | $2 \times 10^{9}$ | $1 \times 10^{9}$ | 1.4 | 1.1 | 1.0 | Normal |

What is claimed is:

1. A reinforced mica paper comprising:

a base made of reinforced mica obtained by mechanically pulverizing muscovite mica or phlogopite mica to form scaly mica and making said scaly mica into paper;

a reinforcing material layer formed on at least one surface of said base; and an adhesive coated on and impregnated in said reinforcing material layer and consisting of a mixture obtained by mixing 100 parts by weight of a silicone resin, 50 200 parts by weight of aluminum hydroxide, 50 to 200 parts by weight of aluminum silicate, 2 to 20 parts by weight of potassium titanate, and 2 to 20 parts by weight of a phlogopite mica powder.

2. A reinforced mica paper according to claim 1, wherein said scaly mica is obtained by laminating muscovite mica or phlogopite ;mica and then mechanically pulverizing said laminated mica paper by water jet.

3. A reinforced mica paper according to claim 1, wherein said aluminum hydroxide has a flaky shape and a grain size of 0.1 to 1 μm.

4. A reinforced mica paper according to claim 1, wherein said aluminum silicate has a flaky shape and a grain size of 1 to 5 μm.

5. A reinforced mica paper according to claim 1, wherein said potassium titanate has a needle shape and a grain size of 10 to 20 μm.

6. A reinforced mica paper according to claim 1, wherein said phlogopite mica powder has a flaky shape and a grain size of 60 to 110 μm.

7. A reinforced mica paper according to claim 1, wherein a material of said reinforcing material layer is a glass fiber fabric, a glass fiber non-woven fabric, a fabric constituted by a glass fiber yarn as a warp and a thermoplastic resin fiber yarn as a weft, a non-woven fabric constituted by a glass fiber yarn as a warp and a thermoplastic resin fiber yarn as a weft, or a plastic film.

8. A method of manufacturing a reinforced mica paper, comprising the steps of:

mechanically pulverizing muscovite mica or phlogopite mica to form scaly mica and making said scaly mica into paper, thereby forming a base made of reinforced mica;

forming a reinforcing material layer on at least one surface of said base material; and coating and impregnating an adhesive consisting of a mixture obtained by mixing 100 parts by weight of a silicone resin, 50 to 200 parts by weight of aluminum hydroxide, 50 to 200 parts by weight of aluminum silicate, 2 to 20 parts by weight of potassium titanate, and 2 to 20 parts by weight of a phlogopite mica powder in said reinforcing material layer.

* * * * *